United States Patent
Rohwer et al.

(10) Patent No.: US 6,854,712 B2
(45) Date of Patent: Feb. 15, 2005

(54) CAPILLARY VALVE THAT CAN BE PULSED (75) Inventors: Egmont Rohwer, Lynnrodene (ZA); Ralf Zimmerman, Munich (DE); Ralph Dorfner, Nicolerding (DE); Antonius Kettrup, Arnsberg (DE)

(73) Assignee: GSF - Forschungszentrum for Unwelt und Gesundheit GmbH, Neuherberg (DE)

( * ) Notice: Subject to any disclaimer, the term of this patent is extended or adjusted under 35 U.S.C. 154(b) by 158 days.

(21) Appl. No.: 10/254,072

(22) Filed: Sep. 24, 2002

(65) Prior Publication Data

US 2003/0042458 A1 Mar. 6, 2003

Related U.S. Application Data (63) Continuation-in-part of application No. PCT/EP01/02423, filed on Mar. 3, 2001.

(30) Foreign Application Priority Data

Mar. 25, 2000 (DE) .......................................... 100 14 962

(51) Int. Cl.[7] .............................................. F16K 31/06
(52) U.S. Cl. .............. 251/318; 251/129.05; 251/129.21
(58) Field of Search ............................ 251/318, 129.01, 251/129.21, 129.05

(56) References Cited

U.S. PATENT DOCUMENTS

| | | | | |
|---|---|---|---|---|
| 2,721,100 A | * | 10/1955 | Bodine, Jr. ............ | 251/129.21 |
| 4,087,986 A | * | 5/1978 | Grahl ......................... | 251/61.3 |
| 4,465,930 A | * | 8/1984 | Brunfeldt ..................... | 250/288 |
| 4,597,558 A | * | 7/1986 | Hafner et al. .......... | 251/129.15 |
| 5,175,433 A | | 12/1992 | Browner et al. | |
| 5,791,531 A | * | 8/1998 | Hassler, Jr. ............. | 251/129.16 |
| 5,954,312 A | * | 9/1999 | Earnhardt ............... | 251/129.15 |
| 6,045,116 A | * | 4/2000 | Willke et al. .......... | 251/129.21 |
| 6,089,475 A | * | 7/2000 | Reiter et al. ........... | 251/129.21 |
| 6,102,364 A | * | 8/2000 | Busato ................... | 251/129.05 |
| 6,190,616 B1 | * | 2/2001 | Jovanovich et al. ... | 137/625.17 |
| 6,199,776 B1 | * | 3/2001 | Andorfer ................ | 251/129.21 |
| 6,250,515 B1 | * | 6/2001 | Newbold et al. ............. | 251/65 |
| 6,415,995 B1 | * | 7/2002 | Enderle et al. ......... | 251/129.21 |

FOREIGN PATENT DOCUMENTS

| | | |
|---|---|---|
| GB | 1 042 003 | 9/1966 |
| JP | 56 126241 | 10/1981 |
| JP | 61 013076 | 1/1986 |

* cited by examiner

Primary Examiner—J. Casimer Jacyna
(74) Attorney, Agent, or Firm—Klaus J. Bach (57) ABSTRACT

In a capillary valve, which can be pulsed and which includes a capillary with a constriction forming a nozzle, a plunger is movably disposed in the capillary and forms, together with the capillary constriction, a seal, and a drive is provided for actuating the plunger within the capillary providing for a small, rapidly responsive, nozzle valve design.

8 Claims, 5 Drawing Sheets

Fig. 4

CAPILLARY VALVE THAT CAN BE PULSED

This is a continuation-in-part application of international application PCT/EP01/02423 filed Mar. 3, 2001 and claiming the priority of German application 100 14 962.6 filed Mar. 25, 2000.

BACKGROUND OF THE INVENTION

The invention relates to a capillary valve that can be pulsed and to the use thereof.

Generally so far, a gas to be analyzed is introduced into the ion source of a mass spectrometer in a continuous or pulsed fashion. In such an arrangement, a supply line (for example, the end of a gas chromatographic capillary) extends into the ion source which, may be of closed design (for example, many CI- or EI ion sources for quadrupole or sector field mass spectrometers) or of open design (for example, many ion sources for flight time mass spectrometers). In ion sources of closed design, an area of the ion source is "flooded" by the gas supplied, that is, the atoms or molecules entered partially bounce onto the ion source walls before they are ionized and detected in the mass spectrometer. The open design of many ion sources for the TOF mass spectrometer favors the use of atom-or molecular beam techniques. In that case, a relatively directed gas jet is conducted through the ion source, such that, ideally, it interacts only very little with the components of the ion source.

For the flight time mass spectometery, effusive molecular beams [R. Zimmerman, H. J. Heger, A. Kettrup, U. Boesl, Rapid Communic. Mass Spectrom. 11 (1997) 1095] as well as skimmed [R. Tembreull, C. H. Sin, P. Li, H. M. Pang, D. M. Lubman; Anal. Chem. 57 (1985) 1186] and unskimmed [R. Zimmermann, H. J. Heger, E. R. Rohwer, E. W. Schlag, A. Kettrup, U. Boesl, Proceedings of the $8^{th}$ Resonance Ionization Spectroscopy Symposium (R1S-96), Penn State College 1996, AIP Conference Proceedings, 388, AIP-Press, Woodbury, N.Y. (1997) 1119] supersonic molecular beams are used (in each case either pulsed or continuous (cw)). Supersonic molecular beam inlet systems permit the cooling of the analysis gas in the vacuum by adiabatic expansion. It is however a disadvantage that, with conventional systems, the expansion must take place relatively far away from the ionization location. Since the density of the gas expansion beam (and consequently, the ion yield for a certain ionization volume) decreases with the distance from the expansion nozzle in square, the achievable sensitivity is limited.

Effusive molecular beam inlet systems do not permit cooling of the sample. However, gas inlet systems for effusive molecular beams can be so constructed that, by way of a metallic needle, which extends to the center of the ion source, the discharge gas is guided directly to the ionization location. A certain electric potential is applied to that needle so as to avoid disturbance of the withdrawal fields in the ion source. The needle must be heated to relatively high temperatures in order to prevent condensation of non-volatile analyte molecules in the needle. Care must be taken that the coldest point is not at the needle tip. The necessary heating of the needle is problematic since the needle must be insulated with respect to the other components of the structure (for example, by a ceramic transition member). Electric insulators are generally also thermal insulators and therefore provide for only a very low heat flow for example from the electrically heated supply duct to the needle. Heating by electric heating elements or an IR radiator is also difficult since the needle extends between the withdrawal plates of the ion source.

The selectivity of the resonance ionization with lasers (REMPI) depends on the inlet system used because of the different cooling properties. Besides the effusive molecular beam-inlet system (EMB), which may be used among others for the detection of complete classes of substances, it is possible, with the use of a supersonic molecular beam inlet system (jet), to ionize in a highly selective and partially even isomer-selective manner. With the common supersonic gas nozzles, which have been developed for spectroscopic experiments, the utilization of the sample amount (that is, the achieveable measuring sensitivity) is not a limiting factor. Furthermore, the existing systems are not designed to avoid memory effects. For the use of REMPI-TOFMS-spectrometers for analytical applications, the development of an improved jet inlet technique would be advantageous. Care is to be taken that the valves are made of an inert material in order to avoid memory effects or chemical decomposition (catalysis) of the sample molecules. Furthermore, for analytical applications, the valves should have no dead volumes. It is also necessary that the valves can be heated to temperatures above 200° so that also relatively involatile compounds of the mass-area >256 amu are accessible. Furthermore, the sensitivity with respect to the effusive inlet technique should essentially not be detrimentally affected by the jet arrangement. This can be achieved mainly by a more effective utilization of the introduced samples in comparison with conventional jet arrangements.

This increase is achieved in that each laser pulse reaches a relatively large part of the sample. Since the excitation volume is predetermined by the dimensions of the laser beam (a widening of the laser beam would reduce the REMPI effective cross-section, which for example with a two-photon ionization corresponds to the square of the laser intensity) it must be tried to optimize the spatial overlap of molecular beam and laser beam. This can be realized for example by a pulsed inlet. Boesl and Zimmermann et al. have presented for example a heatable pulsed jet valve for analytical applications for example for a gas chromatography-jet-REMPI-coupling with minimized dead volume [DE 195 39 589.1].

Pepich et al. presented a GC supersonic molecular beam-coupling for the laser-induced fluorescence spectroscopy (LIF), wherein, with the pulsed inlet and a sample compression, the duty cycle can be increased in comparison with the effusive inlet [B. V. Pepich, J. B. Callis, D. H. Burns, M. Grouterman, D. A. Kalman, Anal. Chem. 58(1986) 2825].

All pulsable inlet systems described so far have the following disadvantages. Because of their geometric dimensions, they need large samples and impulse gas volumes in order to facilitate an adiabatic cooling. Their geometry does not permit the valve outlet to be placed near the ionization location. Because they are mechanical devices, they have long opening times and therefore generate a relatively large gas pulse, which results in a heavy load on the evacuation system.

It is the object of the invention to construct a pulsable capillary valve in such a way that it is suitable for small sample amounts and to indicate a use for such a capillary valve.

SUMMARY OF THE INVENTION

In a capillary valve, which can be pulsed and which includes a capillary with a constriction forming a nozzle, a plunger is movably disposed in the capillary and forms, together with the capillary constriction, a seal, and a drive is provided for actuating the plunger within the capillary, providing for a small, rapidly responsive, nozzle valve design.

Over the state-of-the-art, the arrangement according to the invention has the following particular advantages:

The supersonic molecular beam expansion can be placed directly into the ion source because of the miniaturized design. In this way, the highest density of the gas pulse achievable in principle at the ionization location is obtained. Particular advantages of the gas admission reside in the fact that the sample is cooled adiabatically and the capillary can be well heated up to its lower tip. The arrangement can be so designed that the sample molecules come into contact only with inert materials. With the setting of suitable parameters (for example, gas pressure, impulse gas type), the gas can be cooled by adiabatic expansion into the vacuum of the mass spectrometer (supersonic molecular beam 4), wherein, generally, the gas flow into the ionization chamber is similar to that of a continuous effusive inlet. The flow rates of effusive inlet systems are typically in the area of 0.1–100 ml/min (1 bar). In comparison with an effusive capillary inlet, the inlet according to the invention has the advantage of having a better alignment of the supersonic molecular beam 4, so that a better overlap of laser and gas beams can be achieved (higher sensitivity). The pulsed inlet in addition provides for a better utilization of the sample since the sample pulse length and the laser pulse length can be correlated. Consequently, with the more effective sample utilization, on one hand, the sensitivity can be increased (improved duty cycle) and, on the other, the load on the vacuum system can be reduced. Particularly, with the gas inlet of the type described above, a cooled jet-gas beam can be generated also with low gas flows (<10 ml/min). This is achieved very well as shown for example in FIG. 5 with the capillary restriction A as shown in FIG. 1. A cooling of the inlet gas is advantageous in this connection for many mass spectrometric interrogations. The lower internal energy of cooled molecules results often in a reduced fragmentation degree in the mass spectrum. Particularly advantageous is the cooling for the application of the resonance ionization with lasers (REMPI). When using a so-called supersonic molecular beam inlet system (jet) for the cooling of the gas beam, a highly selective (partially isomer-selective) ionization can be achieved with REMPI [R. Zimmermann, Ch. Lerner, K. W. Schramm, A. Kettrup, U. Boesi; Europ. Mass Spectrom. 1 (1995) 341–351). Since the cooling is achieved by the expansion, the sample gas supply line, the capillary 1, the expansion nozzle 2 and the plunger 3 can be heated without a deterioration of the cooling properties. This is important for analytical applications. Without sufficient heating, sample components may condense in the supply line or in the gas inlet. An important application for the invention is the transfer of a chromatographic eluent or of a continuous sample gas flow from an on-line sampling device (probe) into a cooled supersonic molecular beam 4. The inlet system described herein permits the expansion location to be within the ion source of the mass spectrometer. In this way, the ions can be generated directly or closely below the expansion nozzle 2, which is very advantageous for the achievable detection sensitivity.

The invention will be described below in greater detail on the basis of examples with reference to the figures:

Figure 1A:
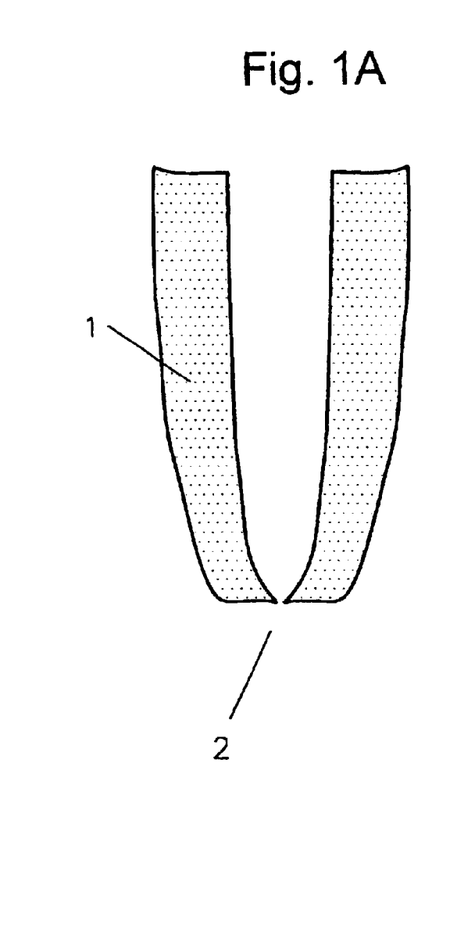
FIGS. 1A, 1B and 1C shows three different nozzle shapes.
Figure 1B:
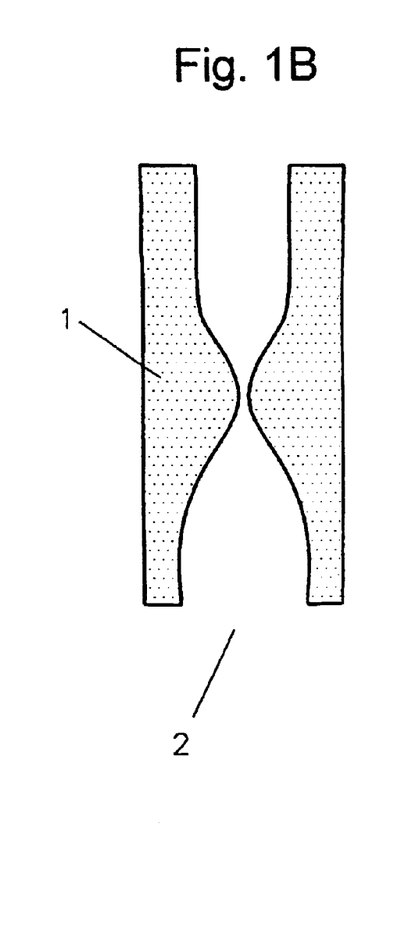
Figure 1C:
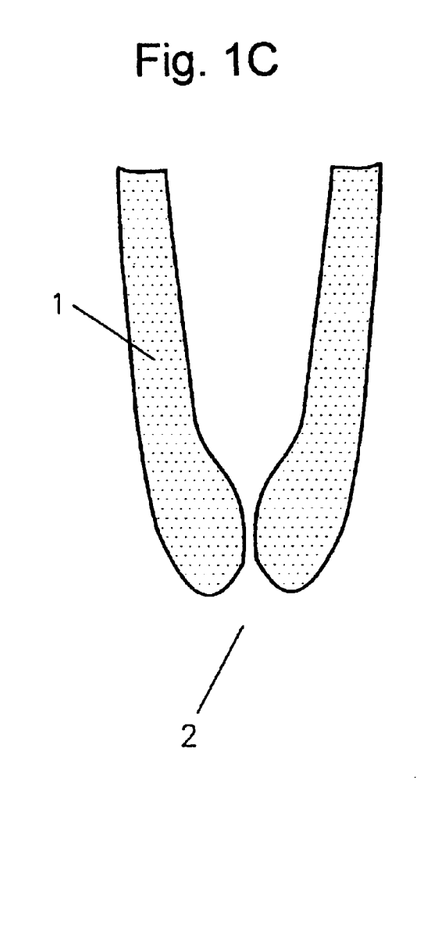

DETAILED DESCRIPTION OF THE FIGURES
FIGS. 1A, 1B, and 1C

Different forms A to C of the nozzle 2 for the capillary 1 are shown.

The nozzle form A can be made by melting the end of the tube together and careful grinding the end to again open the tube and form the nozzle.

The nozzle form B corresponds to a Laval nozzle and can be made by careful local melt-widening.

The nozzle form C provides foe an efficient, relatively short structure.

Figure 2:
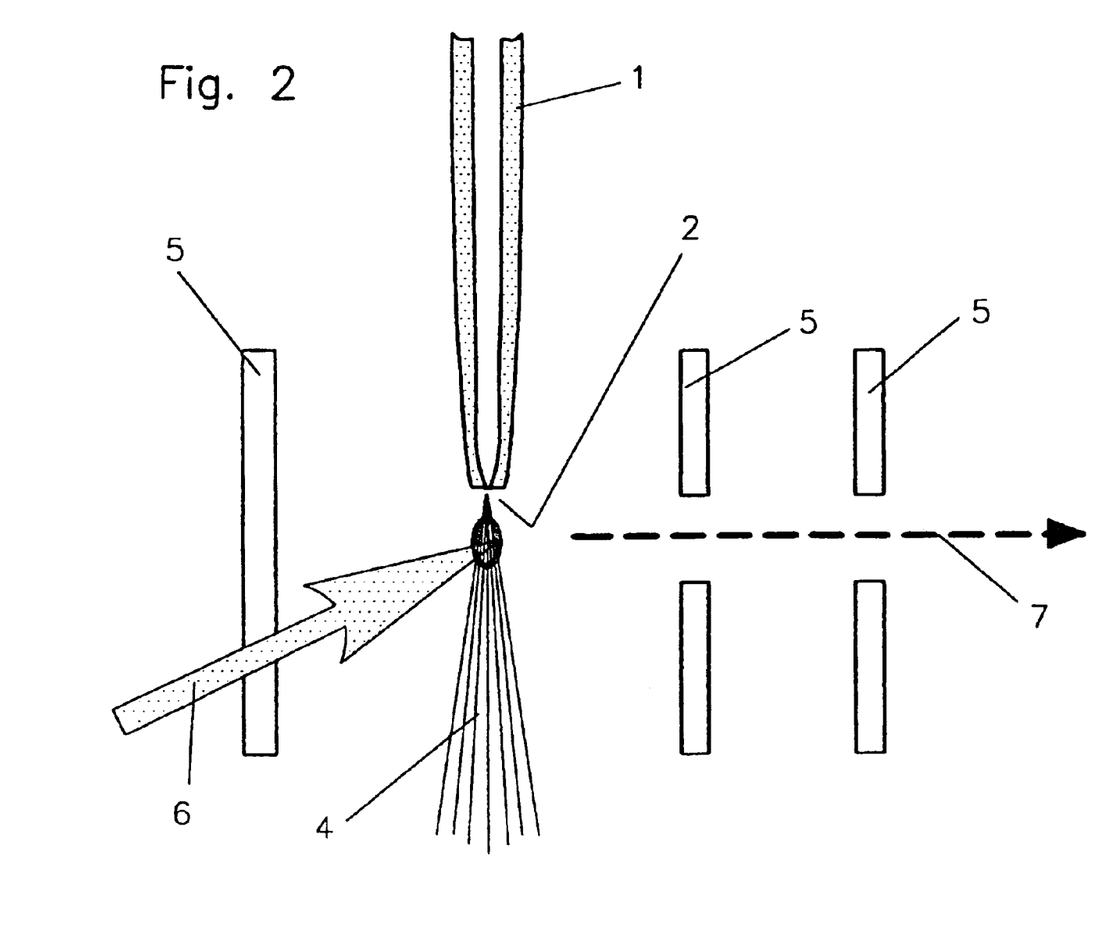
FIG. 2 shows a possible arrangement of the pulsed capillary valve in a flight time mass spectrometer.

FIG. 2

FIG. 2 shows possible arrangement of the gas inlet according to the invention in an ion source of a gas spectrometer with REMPI-ionization by laser pulses 6. The capillary 1 extends between the withdrawal diaphragms 5 of the ion source. The supersonic molecular beam 4 formed is engaged by the ionization laser pulse 6 as close as possible to the nozzle 2. The ions formed are accelerated by electrical fields along the path 7 into the mass spectrometer for the mass analysis. The supersonic molecular beam 4 extends directly toward a vacuum pump. Not shown are heating elements and the conductive coating/envelope of the capillaries 1 as well as the transition into the vacuum with seal.

Figure 3:
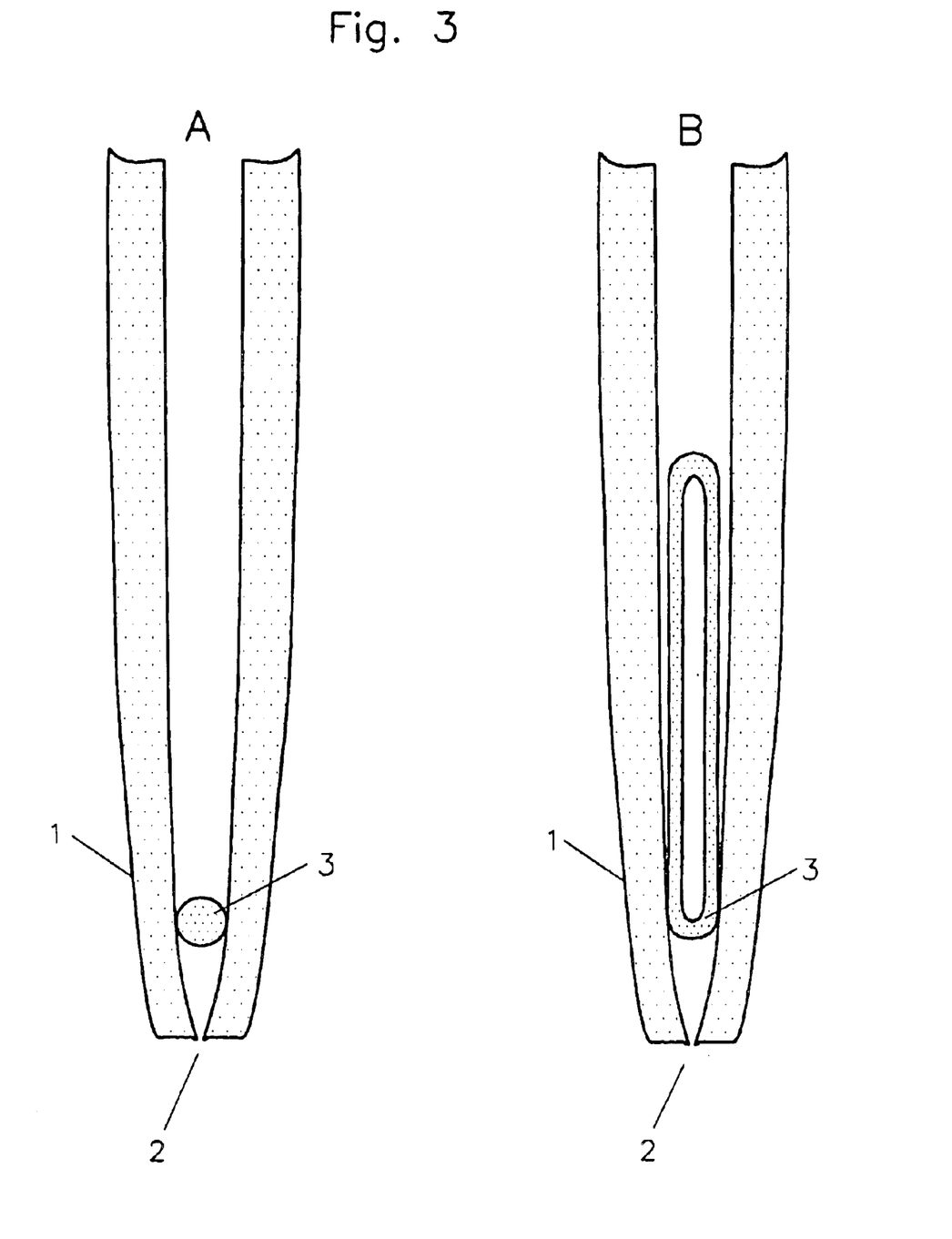
FIGS. 3A and 3B show valves with two different types of plungers.

FIGS. 3A and 3B

Various Possible Plunger Forms are Shown:

FIG. 3A shows a plunger in the form of a ball, whereby canting upon opening and closing is prevented. The relatively small mass of the ball (lower inertia) permits a high opening frequency.

FIG. 3B shows rod-like plungers, which are suitable particularly well for the inclusion of magnetic or easily magnetizable materials as drive components of a simple direct plunger drive components. Long, rod-like plungers reduce the chance of canting whereas short plungers permit higher opening frequencies because of their lower masses.

Figure 4:
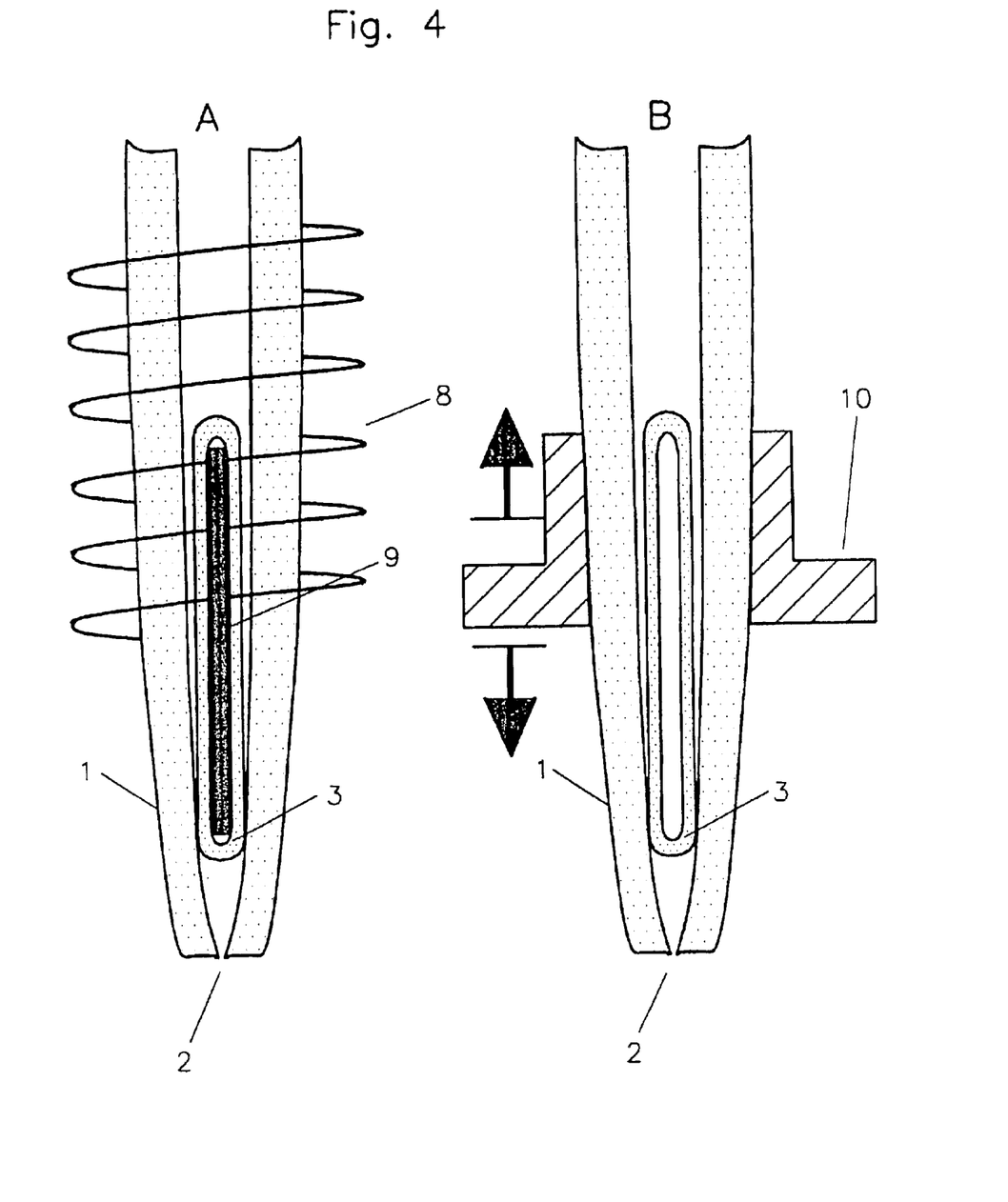
FIGS. 4A and 4B show examples for a direct and an indirect plunger operating mechanism.

FIGS. 4A and 4B

A Direct and an Indirect Plunger Drive are Shown:

FIG. 4A shows a direct drive of the plunger by a coil surrounding the capillary. Because of the encapsulated wire (magnetic or easily magnetizable) the plunger is lifted by electromagnetic fields in an active manner and possibly also actively returned by reversal of the current direction in the electromagnet.

FIG. 4B shows an indirect plunger drive. By a sudden movement of the capillary upwardly or downwardly the plunger within is moved because of an impulse transfer or because of its inertia and as a result unblocks the opening of the nozzle for the sample gas.

Figure 5:
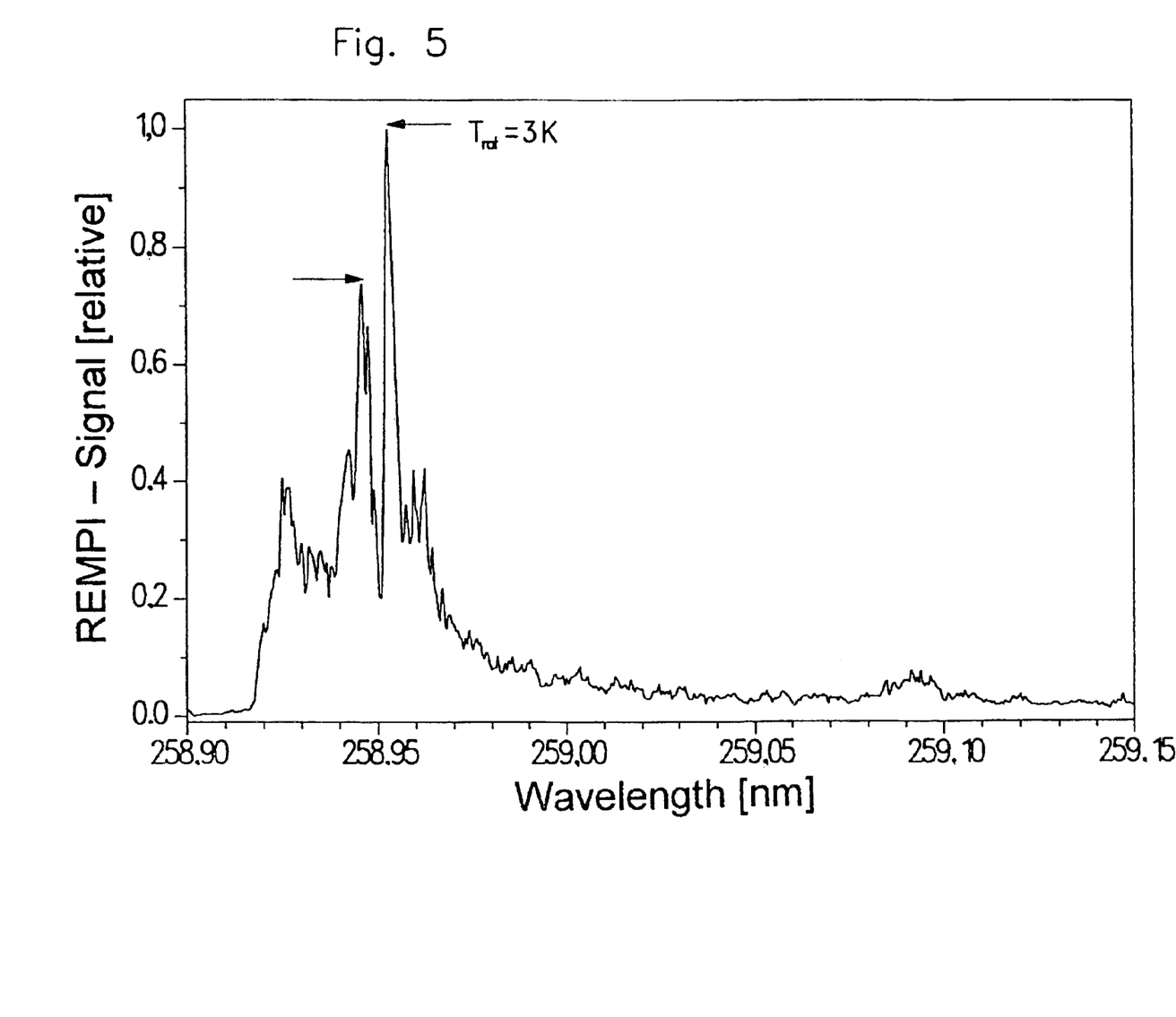
FIG. 5 shows a REMPI spectrum of benzene taken with a gas inlet according to the invention.

FIG. 5

FIG. 5 shows the REMPI-spectrum of the $\nu 6$ in the first excited singulett state of benzene recorded with a gas inlet according to the invention as shown in FIG. 2. Argon with a content of 10% of benzene (1 bar) was expanded through the capillary 1 and the nozzle 2 of the nozzle type A (FIG. 1) into the ion source of a REMPI-TOFMS mass spectrometer. The open nozzle diameter was about 65 μm with a capillary diameter of 530 μm. The gas flow rate was about 8 ml/min. The pressure in the ion source was about $5\times10^{-4}$ bar. The spectrum shows the rotation contour of the $^V6$. From the rotation contour, the rotation temperature can be determined to be about 3K [R. Zimmermann, Ch. Lerner, K. W. Schramm, A. Kettrup, U. Boesl; Europ. Mass Spectrom. 1 (1995) 341–351). This excellent rotation cooling shows that the gas inlet according to the invention provides for the generation of a pulsed supersonic molecular beam 4 with good properties for analytical applications.

The capillary 1 provides for the gas admission and has a typical inner diameter of 0.05–10 mm. At the end, the capillary 1 has a restriction with a typical minimum diameter of 1–50% of the capillary diameter which is designated below nozzle 2. The capillary is connected with its end remote from the nozzle 2 in a gas-tight manner to a sample gas supply, which extends, by way of a vacuum seal, into the mass spectrometer. Alternatively, the end of the capillary 1 remote from the nozzle 2 may be connected, for example by way of an O-ring seal (for example by Kalrez®-O rings) directly out of the vacuum chamber of the mass spectrometer. The nozzle 2 is disposed in, or close to, the ion source of the mass spectrometer and has the following purpose: It is a restriction and in this way forms, upon expansion of the gas into the vacuum, a supersonic molecular beam 4, wherein the molecules are adiabatically cooled.

FIG. 1 shows three different embodiments of this nozzle 2. The nozzle form may be either purely convergent or initially convergent and subsequently divergent (Lavalnozzle). Embodiments A, B, and C are nozzles 2 formed by melt-shaping and possibly additional mechanical working of an end of the capillary 1. The capillary 1 and the nozzle consist of the same material, for example, of quartz or glass. If the capillary 1 consists of metal or ceramics, a quartz or glass piece must be attached for forming the nozzle if a nozzle of the form A, B or C is used. The nozzle can be connected to the capillary for example by a mineral cement or a clamping ring. Alternatively, the nozzle 2 can be melted onto the capillary 1. The manufacture of the form A is described in E. J. Guthrie, H. E. Schwartz; J. Chromatograph. Sci. 24 (1986) 236–241). The forms B and C can be obtained for example by careful melting of the capillary 1 of glass or quartz using a micro-nozzle burner. The smooth inner surface of the embodiments A, B and C is probably responsible for the high quality (that is, cooling properties) of the molecular beams 4 observed. It is important that the pressure drop occurs essentially by way of the nozzle 2 in contrast to effusive inlet techniques.

For use in an ion source, the capillary 1 is generally cooled at the outside with a conductive material or it is contained in a thin metal tube. By way of contact elements, a certain potential can therefore be applied. It is advantageous to use for that purpose also deactivated steel (Silicosteel®). Furthermore, a steel capillary 1 can be directly heated electrically (resistance heating). For such an application, a small design of the capillary 1 is advantageous since, in this way, the withdrawal fields of the ion optic are less disturbed. Furthermore, an electrically conductive coating/envelope of the capillary 1 is necessary in order to adapt the electrical potential of the capillary 1 to the potential in the ion source.

For analytical purposes, the capillary preferably consists of quartz glass, which is de-activated at the inside in order to avoid memory effects. Also, ceramics and glass are suitable herefor. The open width of the nozzle opening should at most be 50% of the capillary inside diameter. Better suitable are capillaries with a nozzle opening of less than 20% of the capillary inner diameter. For example, the nozzle may be formed by melting or by melting and subsequent grinding of the end of the capillary. Furthermore, it is important that the capillary 1 is sufficiently well heated up to its tip. Because of the small opening of the nozzle 2, there is the danger of blockage if sample components condense. It is possible to provide an electric resistance heating by an electrically conductive coating or envelope or to provide an optical heating by way of IR radiation. Also, the capillary 1 may be surrounded by a thermally highly conductive envelope which is heated outside the tight space around the ion source and which provides for sufficient heating of the nozzle 2 by thermal heat conduction thereto.

Otherwise, the capillary 1 can be heated by way of special resistance coatings. An elegant variant is the irradiation of the capillary 1 by IR-radiation, for example, by way of a heating element or a laser diode. In this way, especially the particularly critical nozzle region can be well heated.

Below the operation of a gas inlet of the type with which the present invention is concerned will be described. The narrowed end (nozzle 2) of the capillary 1 extends into the vacuum of the ion source of a mass spectrometer. The capillary 1 consists of quartz glass and has an inner diameter of 530 μm. It includes a nozzle 2 of the form A as shown in FIG. 1 with an inner diameter of 65±10 μm. The end of the capillary 1 with the nozzle 2 is guided in an about 3 cm long, thin, hollow steel needle (for example, a cut-off injection needle) so that the tip of the nozzle 2 projects some 10 μm beyond the end edge of the hollow steel needle. The steel needle is connected to a metal block, which can be heated by heating elements. In addition, a defined electrical potential can be applied to the steel needle. By way of the end of the capillary 1, which is sealed by a graphite compression seal against the atmospheric pressure, the analysis gas can be admitted. In the vacuum downstream of the nozzle, a gas beam is formed. The nozzle acts as a restriction so that the flow through the capillary is only about 1 ml/min at 1 bar and good vacuum conditions of about 10–4 mbar are present in the ion source. The expansion by way of the restriction into the vacuum results in the formation of a supersonic molecular beam 4 with an adiabatic cooling of the sample molecules. This adiabatic cooling is important for example in applications for increasing the selectivity of resonance amplified multi-photon ionization mass spectrometry (REMPI-TOFMS). The capillary 1 extends herein between the diaphragms 5 of the ion source of the mass spectrometer. The capillary 1 with the nozzle 2 may end in the center of the ion source of the mass spectrometer. This is advantageous, since the ionization for example by a laser beam 6 may occur directly below or very close (for example, 1–30 mm) below the nozzle opening 2. The ions formed are then withdrawn, by withdrawal diaphragms 5, into the flight time mass spectrometer for the mass analysis. Since the density of the supersonic molecular beam 4 in the vacuum decreases with the square of the distance from the nozzle opening, a substantially higher sensitivity is achieved with the ionization directly below the nozzle 2. The degree of the cooling also depends on the distance from the nozzle 2. Typically, the optimal cooling is obtained at a distance of 20 nozzle diameters from the nozzle opening 2. Furthermore, ion-molecule reactions may occur directly below the nozzle 2. Since the nozzle diameter of the nozzle 2 is very small (typically 0.1–200 μm), the optimal cooling can be achieved already at a distance of 2–400 µm. Furthermore, from this distance an impulse-free regime can be assumed as a given (that is, no ion-molecule reactions take place which could lower the selectivity). The ionization near the nozzle 2 makes it possible to engage the supersonic molecular beam 4 in its full width with the laser. FIG. 2 shows schematically the arrangement of the capillaries 1 with the nozzle 2 disposed between the diaphragms 5 of the flight time mass spectrometer. The plunger is not shown in FIG. 2. FIG. 5 shows a REMPI spectrum recorded with the arrangement as shown in FIG. 2. The REMPI spectrum in FIG. 5 shows a rotation contour of the benzene. From the spectrum, a rotation temperature of 3K can be derived. This shows that very good properties of the supersonic molecular beam 4 can be achieved also with gas flows of less than 10 ml/min. The REMPI-TOFMS laser mass spectrometer with the gas inlet according to the invention can be used for example for field applications, for example, for the analyses of process gases. In comparison with the state of the art for this application [H. J. Heger, R. Zimmermann, R. Dorfner, M. Beckmann, H. Griebel, A. Kettrup, V. Boesl; Anal. Chem. 71 (1999) 46–57). The gas inlet according to the invention has the advantage of an increased selectivity as a result of the cooling of the gas jet and requires smaller sample amounts and furthermore a reduced load on the vacuum system because of the pulsed inlet.

FIG. 3A shows a capillary with a nozzle wherein the nozzle may be of any design, for example, a design as shown in FIG. 1. The plunger in this case, is a glass ball. This plunger form has the following advantages. It does not cant upon opening or closing of the valve. It has a small mass so that a high valve opening frequency can be achieved. The ball diameter should be at least 50 µm smaller then the inner diameter of the capillary so that sufficient gas can pass by the plunger and through the nozzle. In FIG. 3B, an elongated plunger is disposed in the capillary which itself may consist of a capillary melted closed at both ends. The length of this plunger may be between 5 mm and 20 cm, wherein the longer plunger is less subject to canting and the shorter plunger permits higher valve openings frequencies because of its lower inertia. The outer diameter of the plunger and the inner diameter of the capillary should be different by at least 50 µm. If the plunger is long, the outer diameter of the plunger may be substantially smaller than that of a short plunger. For a safe seal, it should be only 50 µm larger than the nozzle opening. With a smaller width of the plunger, the gas volume supplied to the nozzle can be larger. In this way, the high-pressure difference between the vacuum chamber and the sample admission can be maintained longer and consequently better cooling properties can be achieved.

FIG. 4A shows a magnetic plunger drive as an example for a direct plunger drive. Around the upper part of the capillary, the coil of an electromagnet 8 is indicated. The plunger 3 contains an elongated wire 9 of soft iron or a rod-like permanent magnet 9. With a permanent magnet 9, the plunger can be actively driven up and down by a reversal of the current flow direction, whereas, with a soft iron wire 9, only an active upward stroke is possible. The wire or respectively, the permanent magnet are melted into the plunger without play.

FIG. 4B shows, in an exemplary manner, an indirect drive for the plunger, which is achieved by jerky motions of the capillary 1. The force coupling is achieved by way of a sleeve with a flange 10 which sleeve is attached to the outer capillary wall for example by cementing. As drive, the mechanical and electrical components of a pulse valve can be used. By way of a pulse valve, an upward or downward impulse can be applied to the capillary. With an upward impulse, an upward force impulse is transmitted to the plunger so that the plunger corresponding to the impulse and its own inertia shortly opens the nozzle. With a downward impulse, the plunger opens the nozzle shortly because of its inertia. The capillary is sealed with respect to the atmosphere by means of a graphite compression seal. The seal location should ideally be at least 5 cm, better however 10 cm, away from the impulse mechanics. With a shorter distance, the capillary may break because of the mechanical stresses on the capillary generated by the impulse mechanism.

The operation of the gas inlet according to the invention in a fluorescence cell is even simpler since no consideration must be given to the requirements of an ion lens system as it is the case with an ion source for the mass spectrometer. The capillary 1 can be easily provided with heating elements in this case. For example, a heating wire can be wound around the capillary. Furthermore, the requirements to the vacuum system are lower so that a very compact and inexpensive vacuum cell can be provided for example for field applications of the laser induced fluorescent detection (LIF). The fluorescence can be recorded wavelength dispersed (for example, with an Echelle-spectrograph and a CCD detector) or integrally. If the excitation wavelength is tuned in, excitation spectra can be recorded. An excitation spectrum recorded in a dispersed manner is a two-dimensional spectrum (fluorescence signal as a function of the excitation and emission wavelength). As further analytical dimension, the dying out time of the fluorescence can be employed since different compounds have different fluorescence lives. The combination of a small vacuum chamber with a gas inlet according to the invention, an excitation laser and a fluorescence detector represents an ideal (mobile) gas analysis system for gas samples, which are not too complex. The supersonic molecular beam 4 provides in this connection for a noticeable increase of the selectivity in comparison with an effusive inlet. By directing a tunable narrow-band laser (for example, a compact optical parametric oscillator, OPO) to characteristic absorption lines, an online individual compound analysis can be achieved. In that case, for example, the laser is first tuned to the absorption bands ("on resonance") and the LIF signal is measured. Thereafter, the LIF signal at one or several wavelength positions is determined where the target substance does not absorb ("off-resonance"). From the difference between the "on" and "off resonance" signals the concentration of the target substance can be determined.

For a cost effective process analysis for the purpose of determining on-line for example a sum parameter for the fluorescent aromates, the application of a single wave length for example of the fourth harmonic of the Nd:YAG laser (266 nm) may be reasonable. The gas inlet according to the invention can be utilized for an inexpensive aromatics-selective LIF detector for the gas chromatography. In the HPLC analysis of PAK, for example, fluorescence detection is state of the art. The use of the gas inlet according to the invention for a compact vacuum cell for the LIF detection would consequently provide also for the gas chromatography a detector with properties comparable to those of a HPLC fluorescence analysis but with higher selectivity and sensitivity. The selectivity can furthermore be adjusted by the selection of the excitation location in the supersonic molecular beam 4. Directly below the nozzle 2, the adiabatic cooling of the supersonic molecular beam 4 is not developed yet. At that point, the selectivity is relatively low. Further below the nozzle 2, the selectivity is very high because the cooling of the gas beam 4 has taken effect. With the 266 nm (Nd:YAG) or 258 nm (KrF-Excimer) small aromatics like benzene, toluol, and xylol (BTX) or phenols as well as larger polycyclic aromatics (PAK) can be excited to fluorescence. With long wavelength UV light such as 355 nm (third harmonic frequency of the Nd:YAKL laser) BTX and comparatively small aromatics are not excited whereas much larger PAK can be detected at this wavelength very efficiently by way of LIF.

What is claimed is:

1. Capillary valve that can be pulsed, comprising
   a) a capillary with a constriction formed by a narrowing passage defining a nozzle,
   b) a plunger which is movably disposed in the capillary and which forms, together with the capillary constriction, a seal when the plunger is seated on the wall of the narrowing passage, and
   c) a drive for actuating the plunger so as to unseat the plunger for opening the capillary valve.

2. Capillary valve according to claim 1, wherein the constriction is disposed at one end of the capillary.

3. Capillary valve according to claim 1, wherein at least one of said capillary and said plunger consists of glass or quartz glass.

4. Capillary valve according to claim 1, wherein said plunger is fitted to the capillary constriction by seat-grinding.

5. A capillary valve according to claims 1, wherein said plunger is actuated indirectly by way of the capillary.

6. A capillary valve according to claim 1, wherein said plunger is actuated directly.

7. The use of a capillary valve according to claim 1 as gas supply for an ion source or as gas supply for a UV fluorescence cell.

8. A capillary valve according to claim 3, wherein said plunger includes magnetic particles, and a magnetic coil extends around the capillary for actuating the plunger.

* * * * *